United States Patent

Nester

[11] Patent Number: 6,036,407
[45] Date of Patent: Mar. 14, 2000

[54] SOLIDS CONVEYING SYSTEM FOR COMPACTED, FRIABLE SOLIDS THAT CAN NOT BE PUSHED OR COMPRESSED

[75] Inventor: David Melvin Nester, Baton Rouge, La.

[73] Assignee: Exxon Chemical Patents Inc., Houston, Tex.

[21] Appl. No.: 08/922,540

[22] Filed: Sep. 3, 1997

[51] Int. Cl.⁷ .................................................. B65G 53/40
[52] U.S. Cl. .......................... 406/109; 406/123; 406/141; 406/142; 406/143; 406/151; 406/152; 406/153; 406/173
[58] Field of Search ................................. 406/109, 123, 406/141, 142, 143, 151, 152, 153, 173

[56] References Cited

U.S. PATENT DOCUMENTS

| | | | |
|---|---|---|---|
| 2,687,919 | 8/1954 | Bullington | 406/95 |
| 3,413,038 | 11/1968 | Frazier | 406/14 |
| 3,537,755 | 11/1970 | Schmidt | 406/95 |
| 3,544,167 | 12/1970 | Fuchu et al. | 406/23 |
| 3,690,731 | 9/1972 | Mylting | 406/30 |
| 4,024,655 | 5/1977 | Schweitzer | 37/319 |
| 4,609,309 | 9/1986 | Aralt | 406/56 |
| 4,973,203 | 11/1990 | Oftedal | 406/152 |

FOREIGN PATENT DOCUMENTS

| | | |
|---|---|---|
| 574 596 | 12/1993 | European Pat. Off. . |
| 1474338 | 5/1977 | United Kingdom . |
| 82/00451 | 2/1982 | WIPO . |
| 90/08083 | 7/1990 | WIPO . |

Primary Examiner—Christopher P. Ellis
Assistant Examiner—Richard Ridles
Attorney, Agent, or Firm—Ohlandt, Greeley, Ruggiero & Perle

[57] ABSTRACT

A gas conveying system capable of conveying a solid material without pushing or compressing the solid material. The system comprising: at least one conduit assembly comprising a conduit, a lance assembly disposed about a first end of the conduit which is capable of removing the solid material from a holding device, and a first eductor which is capable of entraining the solid material in a gas stream and moving the solid material through the conduit; a cyclone disposed about a second end of the conduit, the cyclone being capable of separating the solid material from the gas stream; and a second eductor disposed to receive the solid material from the cyclone, the second eductor being capable of entraining the solid material in a second gas stream which has a solid-material-to gas mass ratio which is greater than that of the first eductor. The second stage eductor transports the particles further downstream for storage, additional transport, or for further treatment, such as burning in an incinerator.

16 Claims, 2 Drawing Sheets

SOLIDS CONVEYING SYSTEM FOR COMPACTED, FRIABLE SOLIDS THAT CAN NOT BE PUSHED OR COMPRESSED

FIELD OF THE INVENTION

This present invention relates to a system for conveying solid materials. More particularly, this invention relates to a conveying system which is capable of transporting compacted, friable solid materials, particularly partial oxidation (POX) carbon, without pushing or compressing the solid material.

BACKGROUND OF THE INVENTION

Partial oxidation (POX) carbon requires being transported from a bed of agglomerated POX carbon particles to a container, incinerator or other location which can be at a higher pressure than the pick-up location. Incineration of the POX carbon requires storage and subsequent transport of the POX carbon to the incinerator. POX carbon is a material with unusual properties. It is a powder which appears dry but consists of 80 to 90% free water contained inside a spherical structure of carbon. The powder is friable and easily separates when agglomerated particles are pulled apart. However, it behaves like a solid mass when pushed or compressed.

Because of its physical properties, conventional solid handling equipment that push or compress handled material cannot be used to handle POX carbon. Screw conveyors, drag chain conveyors, rotary feeders, and the like, have been found to cause the POX carbon to compress into a solid mass and, therefore, have not been able to provide reliable, plug free conveyance of the friable POX carbon material.

SUMMARY OF THE INVENTION

Therefore, it is an object of the present invention to provide a novel robotic handling and pneumatic conveying system which is capable of transporting particles of friable, non-free-flowing solid materials, such as POX carbon, using a conveying system that does not push or compress the solid material during transport. That is, the gas conveying system of the present invention provides accelerating and impact forces that are relatively mild compared to other conventional material handling technologies.

It is still a further object of the present invention to provide a unique material conveying system wherein no moving parts contact the material being transported therethrough.

It is also an object of the present invention to provide a unique end effector (i.e., a robotic-guided vacuum pick-up lance) which comprises a cutting disk, vacuum pick-up and mechanical lump breaker. This end effector is capable of slicing a section of the friable material from a compressed bed thereof, and mechanically breaking or mashing the slice into particles that can then be readily transported through the conveyor system without causing plugging.

Finally, it is an object of the conveyor system according to the present invention to use co-axial eductors which allows the solids material to be conveyed such that it passes in a straight line through the eductor, thus avoiding the requirement of conventional eductors where the solid material must experience a turn of up to about 90 degrees during transporting.

SUMMARY OF THE INVENTION

The present invention is directed to a two-stage air or other gas conveying system for conveying particles of a friable material without pushing or compressing the particles into a solid mass. This unique two-stage pneumatic conveying process or system is capable of transporting POX carbon from a bed of agglomerated POX carbon particles to a container, incinerator or other location which can be at a higher pressure than the pick-up location. Although especially useful for for conveying particles of friable material, the present two-stage gas conveying system can also be advantageously used to transport other particulate matter.

The pneumatic (or other gas) conveying system comprises: at least one conduit assembly comprising a conduit, a means disposed about a first end of the conduit which is capable of removing the solid material (e.g., partial oxidation carbon) from a holding means, and a first eductor which is capable of entraining the solid material in a gas stream and moving the solid material through the conduit; a separating means (i.e., a cyclone) disposed about a second end of the conduit, the separating means being capable of separating the solid material from the gas stream; and a second eductor disposed to receive the solid material from the separating means, the second eductor being capable of entraining the solid material in a second gas stream which has a solid material to gas mass ratio which is greater than that of the first eductor.

The second eductor is preferably capable of transporting the solid material downstream for either storage, treatment or further transport.

It is also preferable to provide an acceleration spool between the cyclone and the second eductor. The acceleration spool is capable of accelerating the solid material and gas expelled from the bottom of the cyclone. The cyclone typically includes an inlet and outlet, wherein the cyclone includes a means for preventing the plugging of the inlet.

The first eductor and second eductors preferably produce discharge pressures that are up to about 20.6 KPa above the eductor inlet pressure, when the pressure of the motive fluid applied to the eductors is about 7.9 bar. When a higher pressure motive fluid is used, the eductor discharge pressure will also be higher. The solid material to gas mass ratio of the first eductor is between about 0.5:1 to 1.5:1; whereas the solid material to gas mass ratio of the second eductor is between about 1:1 to 4:1. The first eductor and second eductor are compressed air (or gas)-driven coaxial eductors.

The means disposed about a first end of the conduit which is capable of removing the solid material from a holding means is preferably a novel lance assembly which comprises: a means which is capable of separating a portion of the solid material from a compressed block of the solid material and/or crushing the portion of the solid material into particles of a predetermined size which may be transported via the conduit assembly.

Each system preferably comprises a means (i.e., a robotic guide) which is capable of positioning a lower end of the lance assembly below a surface of the solid material in the holding means and moving the lance assembly in a predetermined pattern through the holding means.

DETAILED DESCRIPTION OF THE PREFERRED EMBODIMENT

Figure 1:
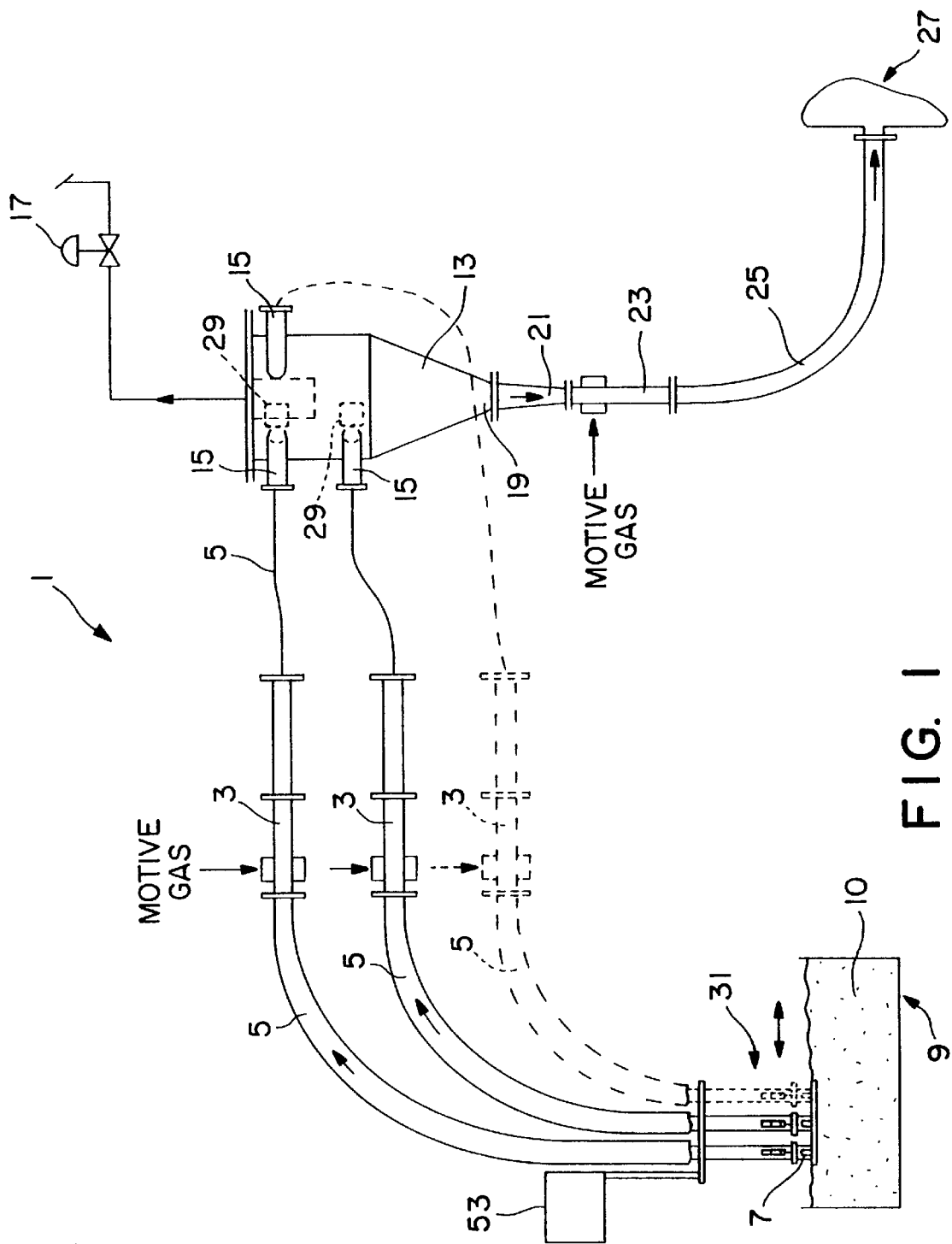
FIG. 1 is a diagrammatic representation of the conveying system of the present invention.

As can best be understood with reference to FIG. 1, the present invention is directed to a two stage gas conveying system, generally referred to by reference numeral 1. The conveying system includes a first stage eductor 3, in line with a conduit 5. A first end of conduit 5 is provided with a pick up head 7, adapted to remove particles of the POX carbon, or other friable, solid material 10 from a storage or holding bin 9 and entrain the particles in a gas stream.

The solid material entrained in the gas stream are transported through conduit 5 to cyclone 13, or other similar separating means. The gas stream enters cyclone 13 through cyclone inlet 15. The cyclone 13 separates the bulk of the gas from the solid material or particles, and discharges the separated gas through a backpressure control valve 17. The POX carbon and a small amount of gas are discharged through cyclone outlet 19. The carbon to gas ratio leaving cyclone 13 is controlled by varying the setting of backpressure control valve 17. Because gas is removed in cyclone 13, the solid material to gas mass ratio of the gas stream leaving cyclone 13 will be greater than the solid material to gas mass ratio entering cyclone 13, which provides for more efficient transport of the particulate or solid material.

Preferably, acceleration spool 21 is provided on cyclone outlet 19. Acceleration spool 21 conveys and accelerates the POX carbon and gas leaving cyclone 13. From acceleration spool 21 the gas stream with entrained particles enters a second stage eductor 23, which discharges the POX carbon and gas into the second stage conduit 25. The stagnation pressure at the discharge of the second stage eductor 23 can be, for example, about 0.123 MPa (3 psig). With POX carbon, a solid to gas mass ratios of between about 1:1 to 4:1 has been achieved. These ratios are higher than those obtainable in the first stage (i.e., carbon to gas mass ratios of between about 0.5:1 to 1.5:1) of the conveying system, in which a greater mass of gas is needed to effect removal of the material from storage or holding bin 9. From second stage eductor 23, the particles are transported through second stage conduit 25 to a location remote from cyclone 13, for further processing or disposal. As an example of disposal, the POX carbon can be transported to incinerator 27 to be burned. Preferably, the particles are ejected from second eductor 23 of the conveyor system under positive pressure. Alternatively, the particles can be transported to at least one additional cyclone (not shown), to provide for additional stages, whereby the solid material can be transported in the additional stages to a further remote location.

As an alternative to the foregoing, a two stage conveying system can be provided without the second stage eductor. In such an embodiment, second stage conduit 25 receives the discharge from cyclone 13 directly, or through acceleration spool 21. By omitting second stage eductor 23, cyclone outlet 19 can be provided with a greater diameter. The greater diameter cyclone outlet 19 allows the passage of larger particles through the second stage of the conveyor system, and reduces the occurrence of cyclone plugging. However, operation without second stage eductor 23 requires cyclone 13 to be operated with a higher backpressure since second stage eductor 23 is not present to pull the particles from cyclone outlet 19. Higher back pressures force the particles from cyclone 13, but reduce the inlet velocity of at lance assembly 31. The inlet velocity at pick-up head 7 dictates the amount of particulate pulled into the system from storage or holding bin 9.

The conveying system of the present invention can be operated with a lance assembly 31 having a single pick-up head 7, or more preferably, can be provided with a lance assembly 31 which includes multiple pick-up heads, each of which communicates with a separate or individual first stage eductors 3. The eductors, including the first stage eductor or eductors, and the second stage eductor, are preferably coaxial eductors, which are commercially available products known to those of ordinary skill in the art. Coaxial eductors allow the solids being conveyed to pass through the eductor in a straight line, thus avoiding the 90 degree turn associated with the use of non-coaxial eductors.

The cyclone described above as a separating means useful in the practice of the present invention is also a conventional piece of equipment known to those of ordinary skill in the art. When used with multiple pick-up heads, however, the conventional cyclone needs to be modified to have multiple cyclone inlets. Preferably, the cyclone inlet, or inlets, will be provided with an anti-fouling baffle 29, the purpose of which is to prevent the accumulation of solids on the wall of the cyclone which can sluff-off and foul the cyclone.

Figure 2:
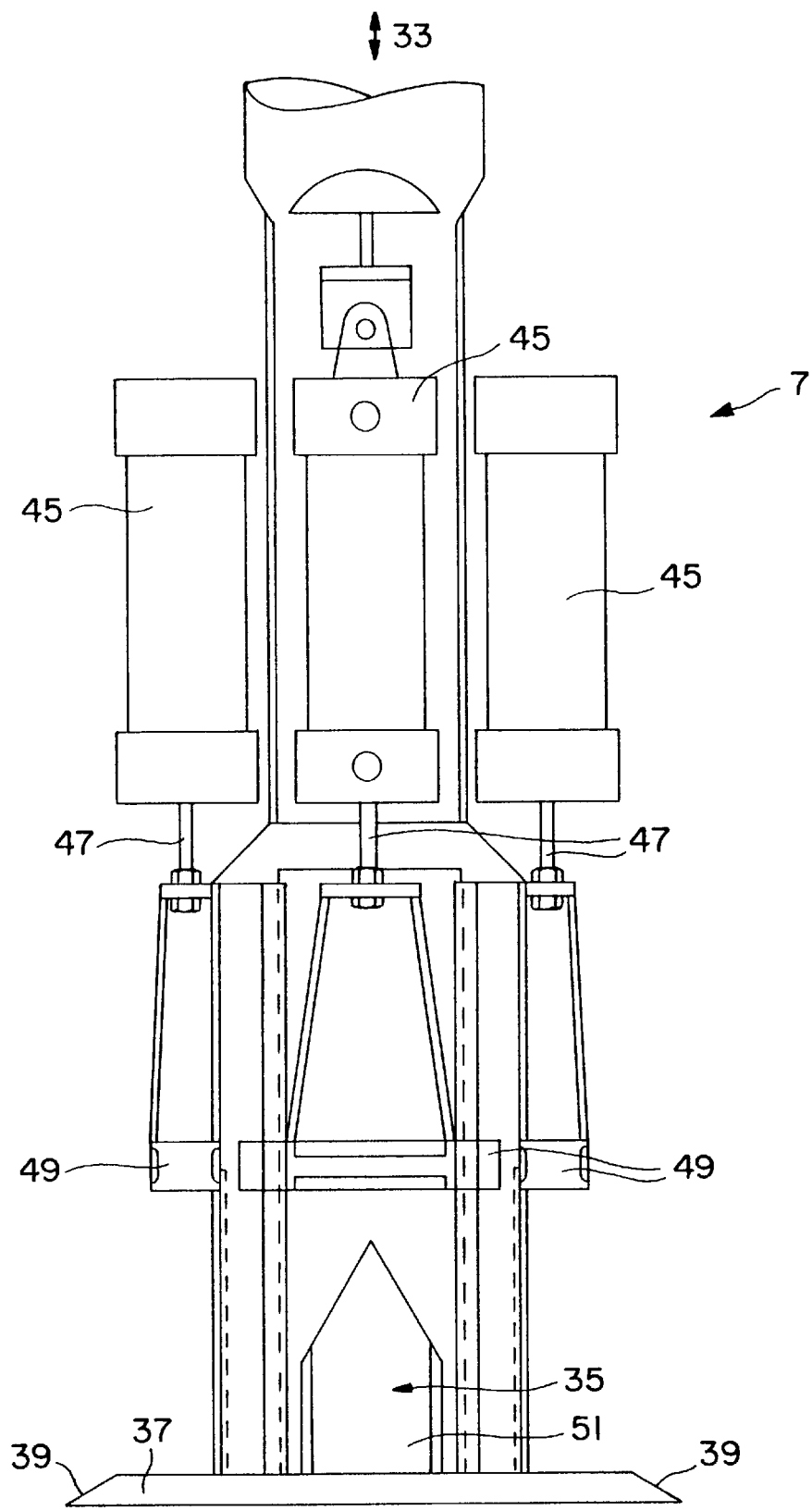
FIG. 2 is a perspective view of a one pick-up head suitable for use with the conveying system of FIG. 1.

A second aspect of the present invention is a lance assembly 31 that can be used in combination with the two-stage gas conveyor system described above. A preferred embodiment of a suitable lance assembly is shown in FIG. 2 and comprises a pick-up head 7 provided with a central air passage 33 through which particulate matter entrained in a gas stream can pass. A first end 35 of pick-up head 7 is attached to a plate 37, formed with beveled edges 39. Beveled edges 39 of plate 37 allow the plate to penetrate compressed blocks of solid material, and slice a relatively thin section therefrom. Each pick-up head 7 of the lance assembly further comprises one or more pistons 45 that are provided with piston arms 47 adapted to reciprocate toward and away from plate 37 in a direction parallel to central air passage 33. The ends of piston arms 47 are provided with crushing surfaces 49 that in their extended position contact, or nearly contact, plate 37.

In operation, lance assembly 31 is moved in a direction substantially parallel to the top of a compressed block of a solid friable material, such that beveled edges 39 of plate 37 penetrates the block of the friable material to slice a relatively thin section therefrom. The slice of solid, friable material, which rests on top of plate 37, is then contacted by the reciprocating crushing surface 49, which crushes the slice of solid material between crushing surface 49 and plate 37, to form particles of the solid material. The particles of solid material, under influence of the motive gas stream provided by first stage eductors 3, are then sucked, along with gas, into central air passage 33, through side openings 51 provided in pick-up head 7 proximal plate 37.

The lance assembly 31 can comprise a single pick-up head 7, or preferably, can comprise a plurality of pick-up heads, each provided with associated crushing means. When a plurality of pick-up heads 7 are used, they can be arranged in a single line, in a side by side configuration, or in any other configuration relative to each other. Pick-up heads 7 can be attached to a common plate 37, which can be elongated, or widened to accommodate a plurality of pick-up heads 7 and provide sufficient area for the crushing surfaces associated therewith. The lance assembly 31 can be manually manipulated through the compressed block of friable material, or can be controlled automatically by, for example, robotic means 53, as shown in FIG. 1.

With the foregoing description of the invention, those skilled in the art will appreciate that modifications may be made to the invention without departing from the spirit thereof. Therefore, it is not intended that the scope of the invention be limited to the specific embodiments illustrated and described.

What is claimed is:

1. A gas conveying system which is capable of conveying a solid material without pushing or compressing said solid material, said system comprising:

at least one conduit assembly comprising a conduit, a means disposed about a first end of said conduit which is capable of removing said solid material from a holding means, and a first eductor which is capable of entraining said solid material in a first gas stream, in a first solid-material-to-gas mass ratio, and moving said solid material through said conduit;

a separating means disposed about a second end of said conduit, said separating means being capable of separating said solid material from said first gas stream; and receiving means for receiving said solid material from said separating means and entraining said solid material in a second gas stream which has a second solid-material-to-gas mass ratio which is greater than said first solid-material-to-gas mass ratio.

2. The system of claim 1, wherein said receiving means comprises a second eductor.

3. The system of claim 2, wherein said second eductor is capable of transporting said solid material downstream of said second eductor.

4. The system of claim 3, wherein said separating means is a cyclone.

5. The system of claim 4, further comprising an acceleration spool disposed between said cyclone and said second eductor, wherein said acceleration spool is capable of accelerating said solid material and a residual portion of said first gas stream expelled from a bottom outlet of said cyclone.

6. The system of claim 4, wherein said cyclone includes an inlet and an outlet, wherein said cyclone further includes a means for preventing plugging of said inlet.

7. The system of claim 6, wherein said plugging preventing means is an antifouling baffle.

8. The system of claim 1, wherein said first solid-material-to-gas mass ratio of said first eductor is between about 0.5:1 to 1.5:1.

9. The system of claim 2, wherein said first solid-material-to-gas mass ratio of said first eductor is between about 0.5:1 to 1.5:1.

10. The system of claim 9, wherein said second solid-material-to-gas mass ratio of said second eductor is between about 1:1 to 4:1.

11. The system of claim 1, wherein said means disposed about the first end of said conduit which is capable of removing said solid material from said holding means is a lance assembly which comprises: a means which is capable of separating a portion of said solid material from a compressed block of said solid material and crushing said portion of said solid material into particles of a predetermined size which may be transported via said conduit assembly.

12. The system of claim 11, further comprising means which is capable of positioning a lower end of said lance assembly below a surface of said solid material in said holding means and moving said lance assembly through said holding means.

13. The system of claim 1, wherein said first eductor is a compressed gas-driven coaxial eductor.

14. The system of claim 2, wherein said first eductor and said second eductor are compressed gas-driven coaxial eductors.

15. The system of claim 1, wherein said solid material is a partial oxidation carbon.

16. The system of claim 11, wherein multiple said conduit assemblies are disposed between said holding means and said separation means.

* * * * *